Jan. 18, 1966     P. G. BOIRON     3,230,149
MEANS FOR MOUNTING PRESSURE POWER TUBES IN A NUCLEAR REACTOR
Filed July 29, 1963     2 Sheets-Sheet 1
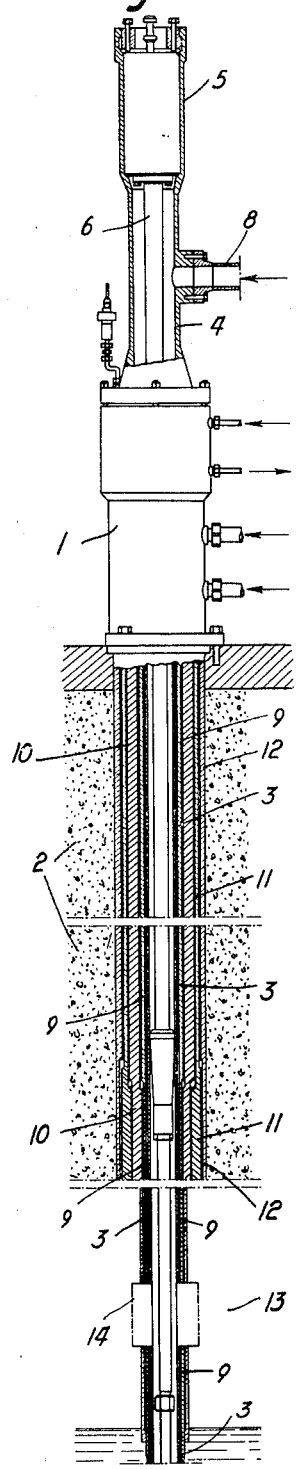
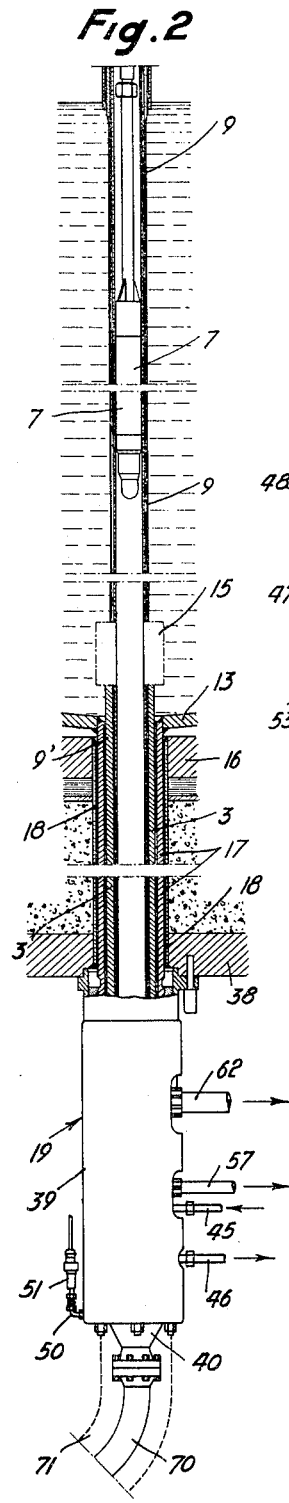
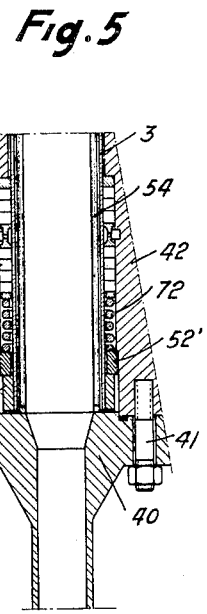
INVENTOR
Pierre G. BOIRON
BY
ATTORNEYS

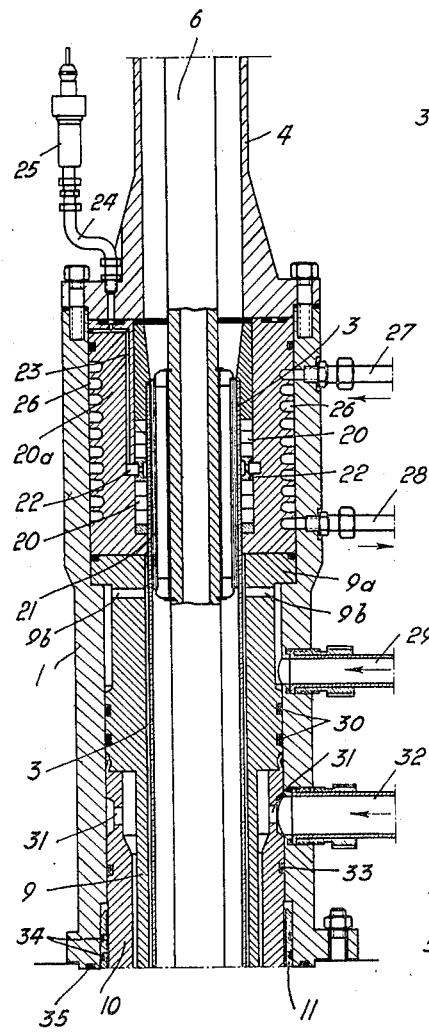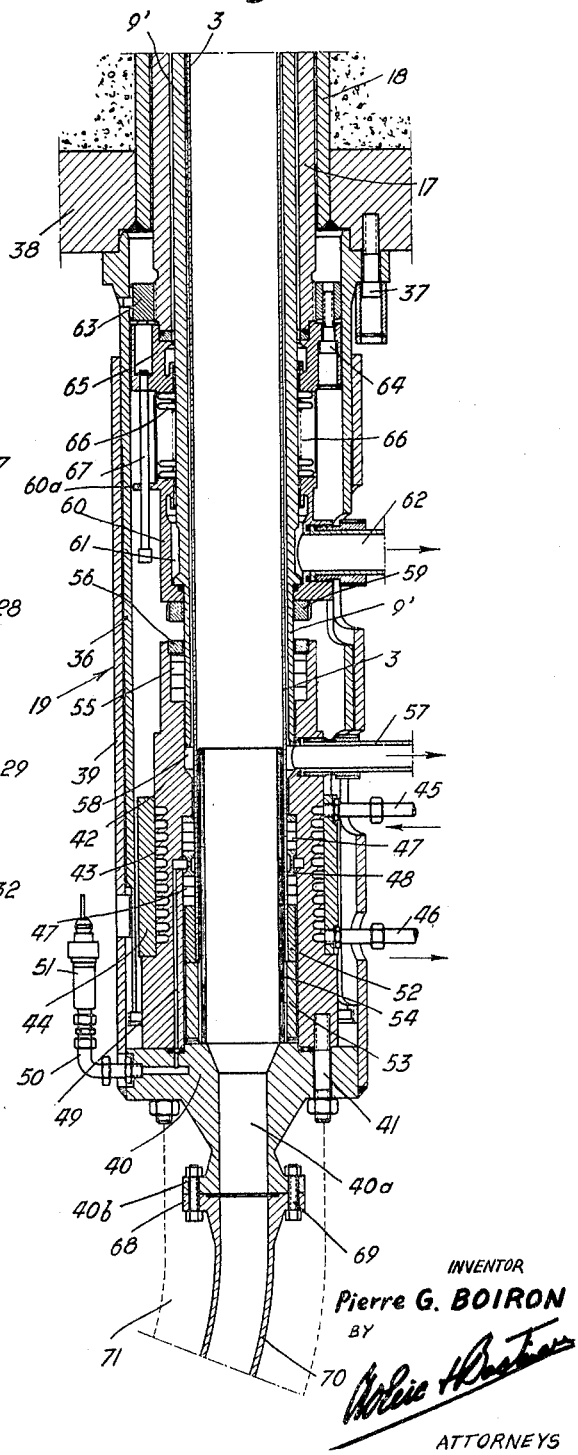

United States Patent Office 3,230,149
Patented Jan. 18, 1966

3,230,149
MEANS FOR MOUNTING PRESSURE POWER
TUBES IN A NUCLEAR REACTOR
Pierre Georges Boiron, Fresnes, France, assignor to European Atomic Energy Community—Euratom, Brussels, Belgium
Filed July 29, 1963, Ser. No. 298,241
6 Claims. (Cl. 176—50)

The present invention relates to means for mounting insulating pressure resisting tubes (herein called pressure tubes) in a nuclear reactor.

Pressure tubes of a nuclear reactor serve to separate and thermally isolate the moderator or the structural materials from the fluid which cools the fuel, these bodies being of different nature and at different conditions of temperature, pressure, etc.

Pressure tubes may be classified according to the nature of the thermal insulation: gaseous, liquid, solid or a combination thereof. They may also be classified as cold or hot pressure tubes depending on whether the structure which resists the pressure is at the cooling fluid temperature or at a lower temperature.

Generally, the thermal insulation lies between two tubes, the main purpose of one of which is to resist the pressure while the purpose of the other one is to act as a gate or barrier between the different fluids or materials.

From the above, it can be seen that the mounting of pressure tubes presents certain problems by reason of their variety.

It is an object of the present invention to provide mounting means usable on the various types of pressure tubes and fuels which have just been mentioned.

The mounting means makes it possible to use and test pressure tubes on account of the arrangement of connecting devices near the core or heart of the reactor but protected from radiation. The connecting devices are also responsible for: the setting-up and holding of the pressure tubes; the tight connection of its ends or of its extensions to the cooling circuit while allowing for the necessary expansions; the eventual cooling of all or part of the pressure tubes; the setting-up and holding of the fuel elements.

The mounting means according to the invention therefore comprises two connecting devices, also called connections, located on either sides of the heart of the reactor.

The mounting means is for use in a nuclear power reactor having a pile body defining a reaction tank with a top wall and a bottom wall, at least one pressure tube projecting through said walls, the said mounting means comprising: an upper connector formed of an upper sleeve secured to the top wall of said tank and surrounding the upper end of the pressure tube in spaced relation; means securing the upper end of the pressure tube to said sleeve in fluid-tight engagement; an upward extension on said sleeve beyond the open upper end of said pressure tube; a fuel assembly; said extension having an orifice shaped to receive said fuel element; means securing said assembly on said extension whereby said assembly is loaded into said pressure tube; means for circulating coolant fluid between said sleeve and said pressure tube; means through said sleeve for the passage of coolant fluid between said pressure tube and fuel element therein; a lower connector formed of a lower sleeve surrounding the lower end of said pressure tube and secured to the bottom wall of said tank, and sealing means between said pressure tube lower end and said lower sleeve which permit relative axial movement between said tube and said lower sleeve.

The sealing means may or may not be cooled by a fluid circuit.

Leak detection rings, connected to detecting apparatuses, are advantageously incorporated in the devices.

The extension bellow of the lower connection is located between the lower tubular sheath and the extension of the lower tank.

If the pressure tube is formed without flanges, tightness may be ensured with a packing.

If the tube can be provided with end flanges, tightness is obtained by flange joints and the assembly is simpler.

An embodiment of upper and lower connecting devices made according to the teaching of the invention, in the case where the pressure tube is a gas insulated hot type tube having no flanges and wherein the cooling fluid is an organic liquid, is described hereinafter with reference to the appended drawings wherein:

FIG. 1 is an elevation view, partly in cross-section, of the upper section of a pressure tube mounted on the upper connecting device;

FIG. 2 is an elevation view of the lower part of the same pressure tube provided with the lower connecting device;

FIG. 3 is a view in cross-section, on a larger scale, of the upper connecting device;

FIG. 4 illustrates, on an enlarged scale cross-sectional view, the connecting device of the lower connection;

FIG. 5 is a cross-sectional view of a modification of the packing joint of the lower connection.

In FIG. 1, the upper connecting device is shown to comprise a sleeve 1 secured to the upper tubular body 2 of the reactor and serving as a fixed securing device for a pressure tube 3 the tube hanging from its attachment to sleeve 1.

At the upper end of sleeve 1 is a sleeve extension 4 the upper opening of which constitutes a loading and unloading orifice for fuel. This arrangement makes it possibe to transfer the fuel loads to the structure 2 of the pile body and no longer on the pressure tube.

An operating head or plug 5 is housed within extension 4 and is connected to fuel element 7 by means of a rod 6. Laterally of the extension is the inlet 8 of the organic cooling fluid.

Within sleeve 1 are mounted: the tubular sheath 9 (or calandria tube) surrounding the pressure tube 3, the annular plug 10 and the extension 11 of the upper tank. Sleeve 1 seats on top of the upper tubular body 2.

The pressure tube 3 and sheath 9 enter into tank 13 (FIG. 2) and, at this inlet point, there may be a junction 14 for taking tests under flow (e.g. tests for leaks at the joint between the pressure tube and an extension tube).

A thermal insulating gas is introduced between tubes 3 and 9.

Another junction 15 may be provided at the outlet of the pressure tube 3 from tank 13 also for tests under flow.

The pressure tube then penetrates through the lower tubular body 16 inside an extension 9' of the tubular sheath, an extension 17 of the lower tank and case 18 of the lower tubular body.

Pressure tube 3 and sheath extension 9' then proceed into the lower connecting device 19 (see FIG. 4) described below.

Referring now to FIG. 3, it is seen that sleeve 1 houses a stuffing box 20a constituted by a cylindrical body in the upper part of which is received the packing 20 surrounding pressure tube 3. An insulating ring 21 is also mounted on the outer surface of tube 3, at the same location. Packing 20 is divided into two parts by the leak detecting ring 22, the latter being in communication with a detecting apparatus 25 by means of channels 23 and conduit 24.

A helicoidal groove 26 is provided at the periphery of the stuffing box 20a to allow for circulation of a cooling fluid entering by an inlet tubing 27 and leaving by an outlet pipe 28.

Head 9a of sheath 9 seats on shoulders provided in sleeve 1 and channels 9b are provided for the circulation of an insulating gas coming in by an inlet tubing 29, channels 9b allowing the circulation of the gas between the sheath and the pressure tube. Packing joints 30 insure sealing of the circuit. The gas which passes between sheath 9 and tube 3 leaves by outlet 57, later described.

Head 9a of sheath 9 is inserted in the upper portion of the annular plug 10 which comprises apertures 31 for the flow of heavy water admitted in the sleeve through tubing 32 and circulating between the said plug and the sheath 9. A packing joint 33 provides the necessary seal. The heavy water escapes into the tank 13 through a suitable outlet.

Further packing joints 34, 35 complete the sealing of the sleeve.

Sealing may be obtained by means of standard materials such as plastic, elastomers, etc., because all the foresaid joints are located in a zone where radiation is very weak. Particularly, smooth pressure tubes may be used with the tightness obtained by means of cooled packings, as described above, or non-cooled packings, mounted in the sleeve.

This mounting procedure may be applied to different pressure tubes or fuels commonly used, with slight modifications.

FIG. 4 is a cross-section of the lower connecting device 19 which is constituted as follows:

It first comprises a cylindrical hollow support sleeve 36 secured, by means of bolts 37, against the lower face of the lower tube-holding body 38.

A telescopic guide sleeve 39, terminated at one end by a head 40, may be made to slide outwardly of and along the sleeve 36. On head 40 is secured, by means of bolts 41, a packing assembly 42 provided, at its periphery, with the helicoidal groove 43 closed by a sleeve 44 secured on assembly 42. Two tubings 45 and 46 are mounted on this sleeve to provide, with groove 43, a cooling circuit by means of an appropriate fluid.

In the body of assembly 42 is housed a packing 47 divided into two parts by a leak detection ring 48 connected to a leak detecting apparatus 51 by means of a channel 49 and conduit 50. Packing 47 is pressed between an internal flange of assembly 42 and a ring 52 seating on a ring 53 secured at the end of pressure tube 3. An insulating ring 54 is disposed inwardly of power tube 3. The arrangement is such that the weight of sleeve 39, head 40 and assembly 42 is carried by tube 3 and these parts are able to move up and down with expansion and contraction of the tube 3, also expansion of the body of the assembly is permitted by sliding on tube 3.

At its upper end, assembly 42 contains a packing 55 pressed by a ring 56 and surrounding the base of the sheath extension 9'. Accordingly, relative up and down movement between assembly 42 and extension 9' is permitted.

On assembly 42 is secured a tubing 57 opening into an annular chamber 58 and allowing the exhaust of the insulating gas circulating between sheath extension 9' and pressure tube 3.

On the sheath extension 9' is secured by means of a ring 59 a sleeve or jacket 60 defining, around the said extension, an annular chamber 61 within which opens a tubing 62 for the discharge of heavy water of which a small amount is permitted to pass along the tubes into the tank 13 for cooling purposes.

On the other hand, on the extension 17 of the lower tank is threaded a ring 63 on which is secured, by means of bolts 64, a member 65 integral with a metallic expansion bellows 66, member 65 carrying one or several guiding rods 67 passing through ears 60a provided on sleeve 60. The lower end of the bellows is fixed to sleeve 60.

Accordingly, lengthwise expansion and contraction of extension 9' relative to extension 17 is accommodated by the bellows 66.

Head 40, having an inner channel 40a, includes a flange 40b on which is applied another flange 68 by means of bolts 69. Flange 68 is integral with a channel 70 for the flow of organic cooling fluid. This channelling 70 is surrounded by a heat proof jacket 71.

FIG. 5 illustrates a further embodiment wherein resilient means such as spring 72 is disposed between ring 52' integral with assembly 42 and packing 47 surrounding pressure tube 3.

It thus can be seen that from the standpoint of inlet and outlet of fluid, sealing and assembly, the lower connecting device acts practically in the same manner as the upper connection device. It further offers the particular feature of serving as a guide for the pressure tube by allowing differential expansions between the component parts thereof, the tank and the reactor structures due to its telescoping sleeve. Furthermore, it has a bellows 66 which allows for the absorption of expansion produced on the cooling circuit of the pressure tube, that is, between the lower tubular sheath extension 9' and the extension 17 of the lower tank.

This assembly makes it possible to reduce to a maximum the axial stresses applied on the pressure tube.

Modifications as to form and details may be made to the assembly just described without departing from the spirit of the invention.

Thus, for instance, the connecting devices could be slightly modified according to whether the insulator circulating or disposed between the pressure tube 3 and sheath 9 and extension 9' is a gas, a liquid or a solid material, these changes affecting in no way the essential characteristics of the mounting assembly which is the object of the invention.

I claim:

1. In a nuclear power reactor having a pile body defining a reaction tank with a top wall and a bottom wall, at least one pressure tube projecting through said walls, a mounting combination for said pressure tube on said tank comprising:

(A) an upper connector formed of
an upper sleeve secured to the top wall of said tank and surrounding the upper end of the pressure tube in spaced relation;
means securing the upper end of the pressure tube to said sleeve in fluid-tight engagement;
an upward extension on said sleeve beyond the open upper end of said pressure tube;
a fuel assembly;
said extension having an orifice shaped to receive said fuel assembly;
means securing said assembly on said extension to be suspended therefrom whereby said assembly is loaded into said pressure tube;
means for circulating coolant fluid between said sleeve and said pressure tube;
means through said sleeve for the passage of coolant fluid between said pressure tube and fuel element therein;

(B) a lower connector formed of
a lower sleeve surrounding the lower end of said pressure tube and secured to the bottom wall of said tank, and
sealing means between said pressure tube lower end and said lower sleeve which permit relative axial movement between said tube and said lower sleeve.

2. In a nuclear power reactor having a pile body defining a reaction tank with a top wall and a bottom wall, at least one pressure tube projecting through said walls, a mounting combination for said pressure tube on said tank comprising:

(A) an upper connector formed of
an upper sleeve secured to the top wall of said tank and surrounding the upper end of the pressure tube in spaced relation;
means securing the upper end of the pressure tube to said sleeve in fluid-tight engagement;
an upward extension on said sleeve beyond the open upper end of said pressure tube;
a fuel assembly;
said extension having an orifice shaped to receive said fuel assembly;
means securing said assembly on said extension to be suspended therefrom whereby said assembly is loaded into said pressure tube;
(B) a tubular sheath secured at the upper end thereof to said sleeve outwardly of and in spaced relation with said pressure tube; said sheath extending through said walls and terminating short of the lower end of said pressure tube, outwardly of said tank;
(C) means for circulating coolant fluid between said sheath and said pressure tube;
(D) means through said sleeve for the passage of coolant fluid between said pressure tube and fuel element therein;
(E) a lower connector formed of
a lower sleeve surrounding the lower ends of said pressure tube and sheath and secured to the bottom wall of said tank;
a seal between the pressure tube and the sheath, and
a further seal between the sheath and the lower sleeve,
each seal permitting axial movement.

3. A combination as claimed in claim 2, and including means for circulating coolant fluid within said lower connector.

4. A combination as claimed in claim 2, wherein said means for circulating coolant fluid between said sheath and said pressure tube includes inlet means through said upper sleeve and the upper end of said sheath and outlet means through said seal between said pressure tube and sheath and through said lower sleeve.

5. In a nuclear power reactor having a pile body defining a reactor tank with a top wall and a bottom wall, at least one pressure tube projecting through said walls, a mounting combination for said pressure tube on said tank comprising:
(A) an upper connector formed of
an upper sleeve secured to and above said top wall and surrounding the upper end of the pressure tube in spaced relation;
means securing the upper end of the pressure tube to said sleeve in fluid-tight engagement;
an upward extension on said sleeve beyond the open upper end of said pressure tube;
a fuel assembly;
said extension having an orifice shaped to receive said fuel assembly;
means securing said assembly on said extension to be suspended therefrom whereby said assembly is loaded into said pressure tube;
(B) a tubular sheath secured at the upper end thereof to said sleeve outwardly of and in spaced relation with said pressure tube; said sheath extending through said walls and terminating short of the lower end of said pressure tube, outwardly of said tank; said sheath being also in spaced relation with said sleeve and with an orifice in said upper wall of said tank through which said sheath and tube project, whereby to lead into said tank;
(C) means for circulating coolant fluid between said sheath and said pressure tube;
(D) means for circulating a moderator coolant in the space between said sheath and sleeve and leading into said tank;
(E) means through said sleeve for the passage of coolant fluid between said pressure tube and said fuel element therein;
(F) a lower connector formed of
a lower sleeve surrounding the lower end of said pressure tube and sheath and secured to the bottom of said tank;
a seal between the pressure tube and the sheath, and
a further seal between the sheath and the lower sleeve;
each seal permitting axial movement;
(G) the lower end of said sheath being spaced from an orifice in said lower wall through which said sheath and pressure tube project whereby to define a passage for moderator coolant in said tank, and
(H) means in said lower sleeve closing said passage and including outlet means for said moderator coolant.

6. A combination as claimed in claim 5, wherein said means for circulating coolant fluid between said sheath and said pressure tube includes inlet means through said upper sleeve and the upper end of said sheath and outlet means through said seal between said pressure tube and sheath and through said lower sleeve.

References Cited by the Examiner

UNITED STATES PATENTS 2,977,297 3/1961 Evans et al. _____ 176—52
3,108,053 10/1963 Vrillon et al. _____ 176—51

FOREIGN PATENTS 894,668 4/1962 Great Britain.

LEON D. ROSDOL, *Primary Examiner.*

REUBEN EPSTEIN, BENJAMIN A. BORCHELT,
*Examiners.*

L. DEWAYNE RUTLEDGE, *Assistant Examiner.*